Aug. 30, 1949.　　　　G. O. YOUNG　　　　2,480,175
KNITTING MACHINE
Filed Aug. 2, 1944　　　　16 Sheets-Sheet 1
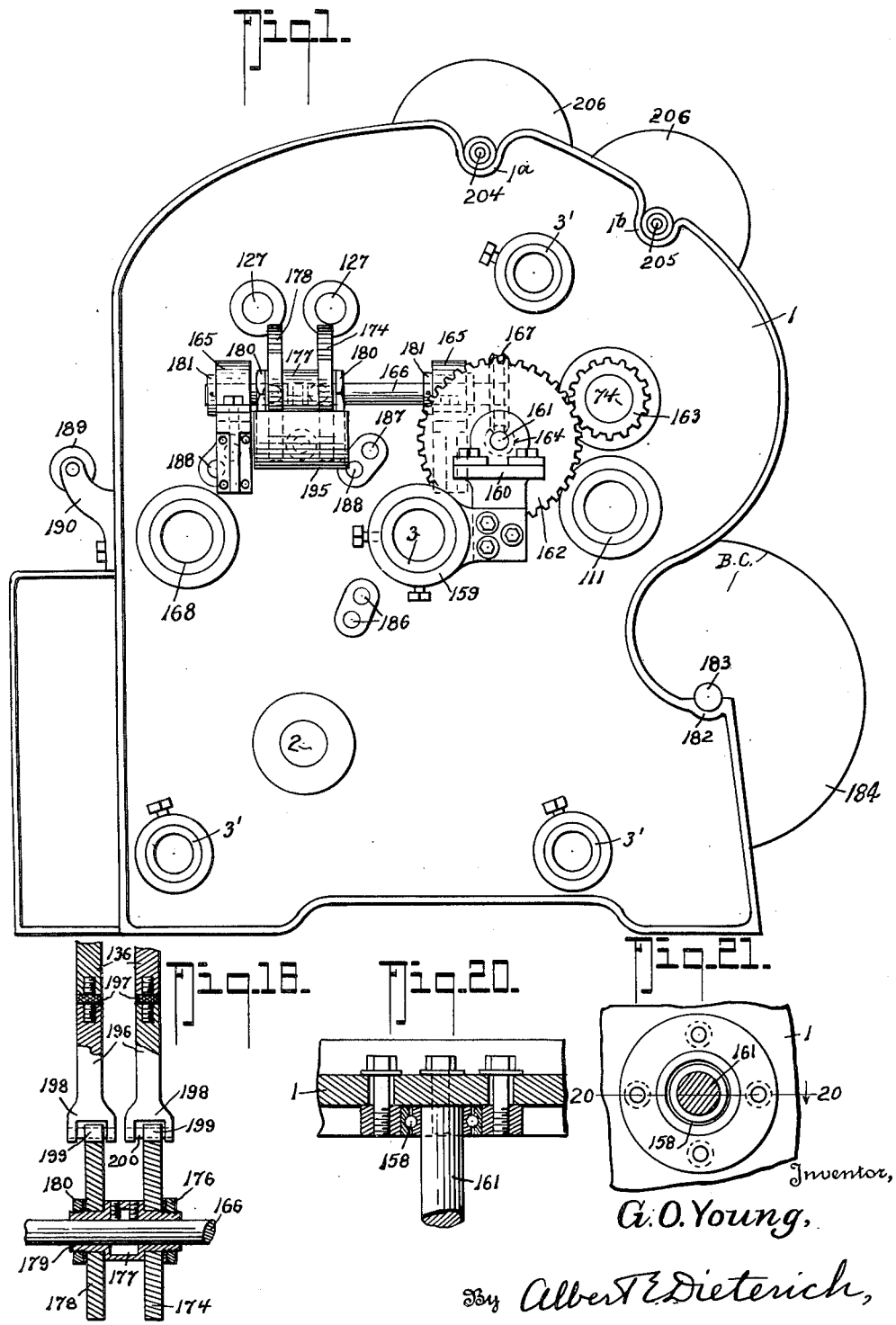
Inventor,
G. O. Young,
By Albert E. Dieterich,
Attorney.

Aug. 30, 1949. G. O. YOUNG 2,480,175
KNITTING MACHINE
Filed Aug. 2, 1944 16 Sheets-Sheet 2
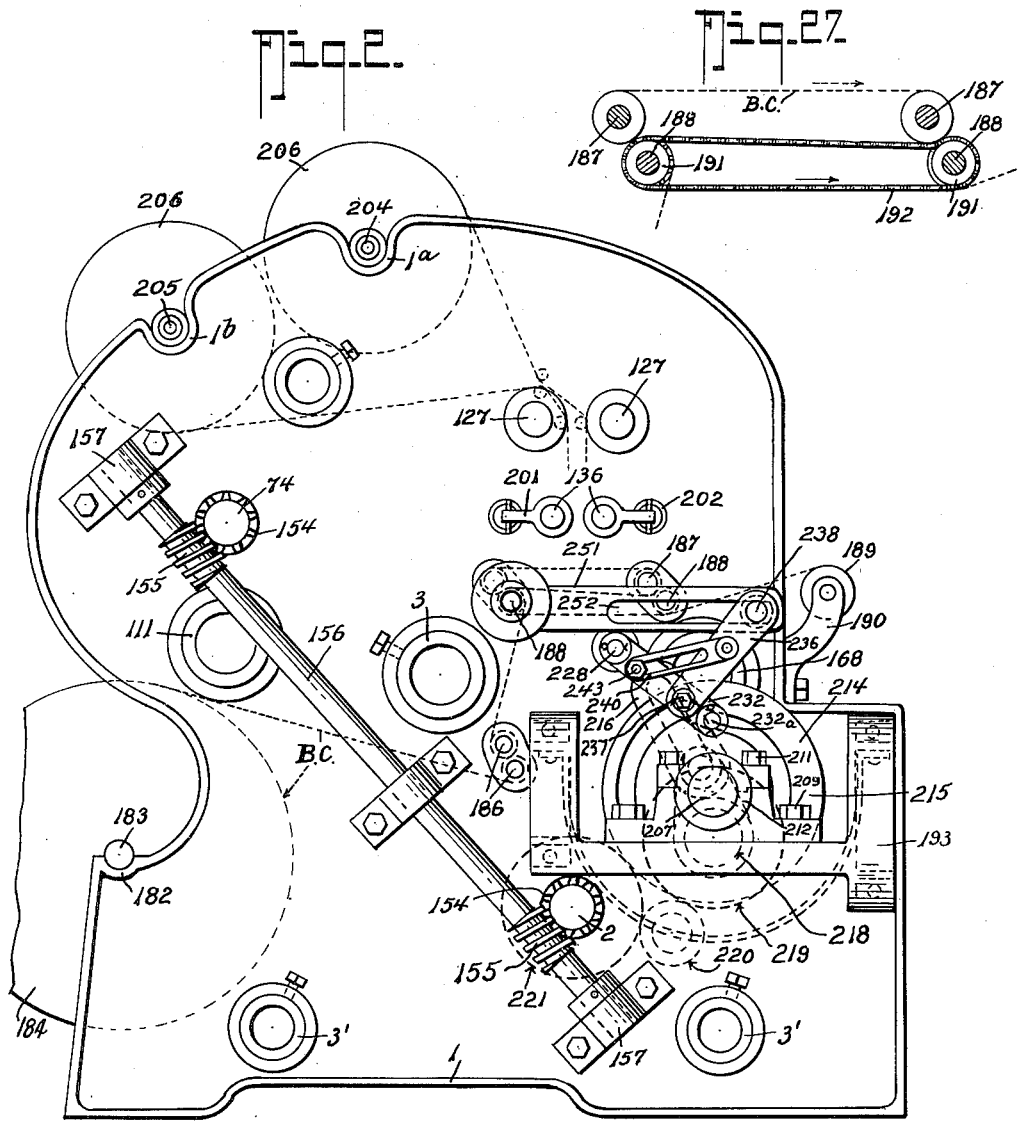
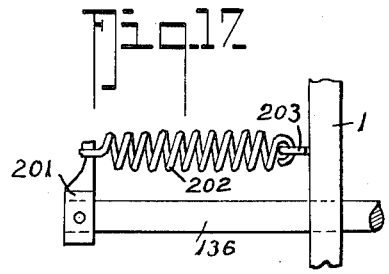
Inventor,
G. O. Young,
By Albert E. Dieterich,
Attorney.

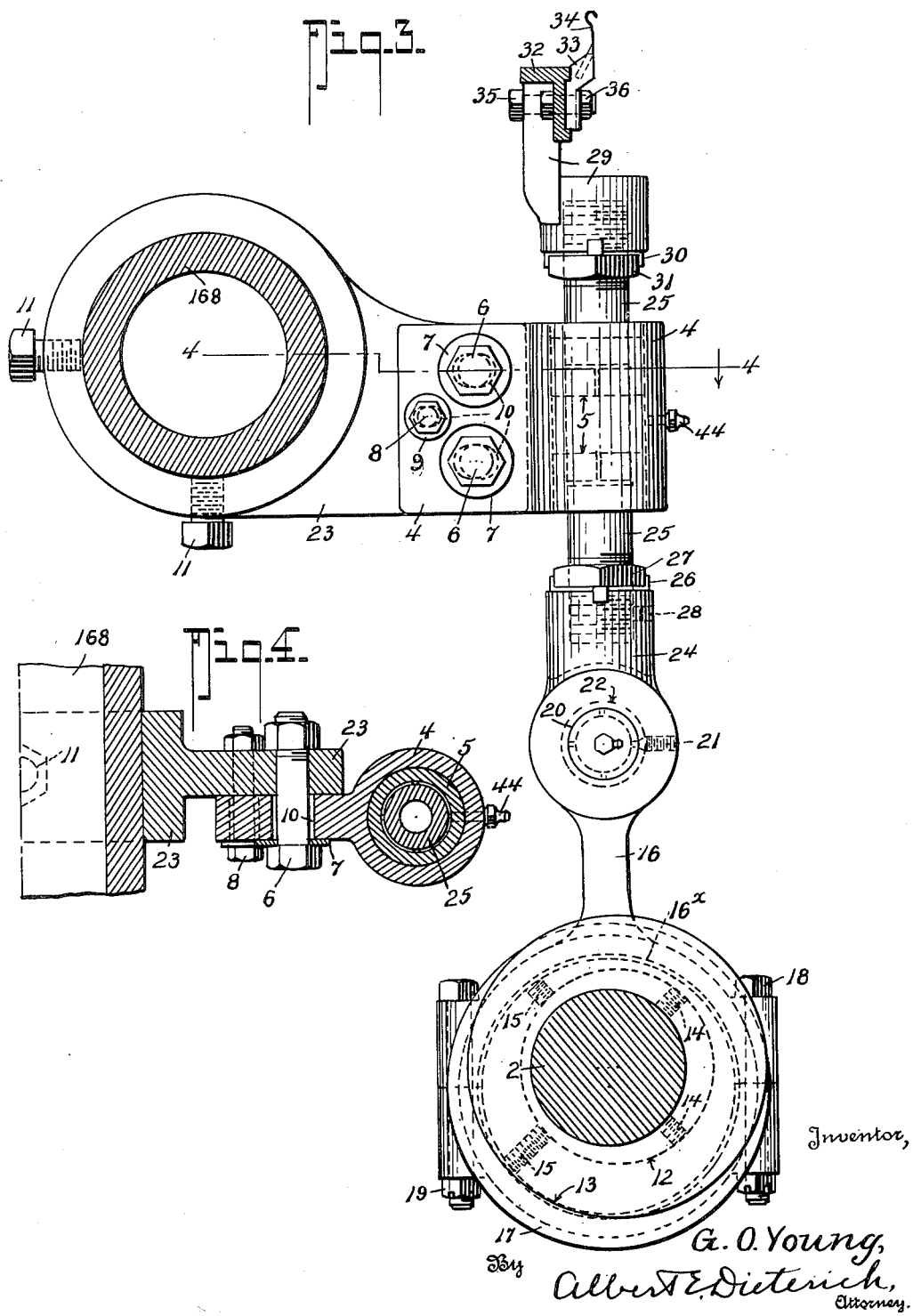

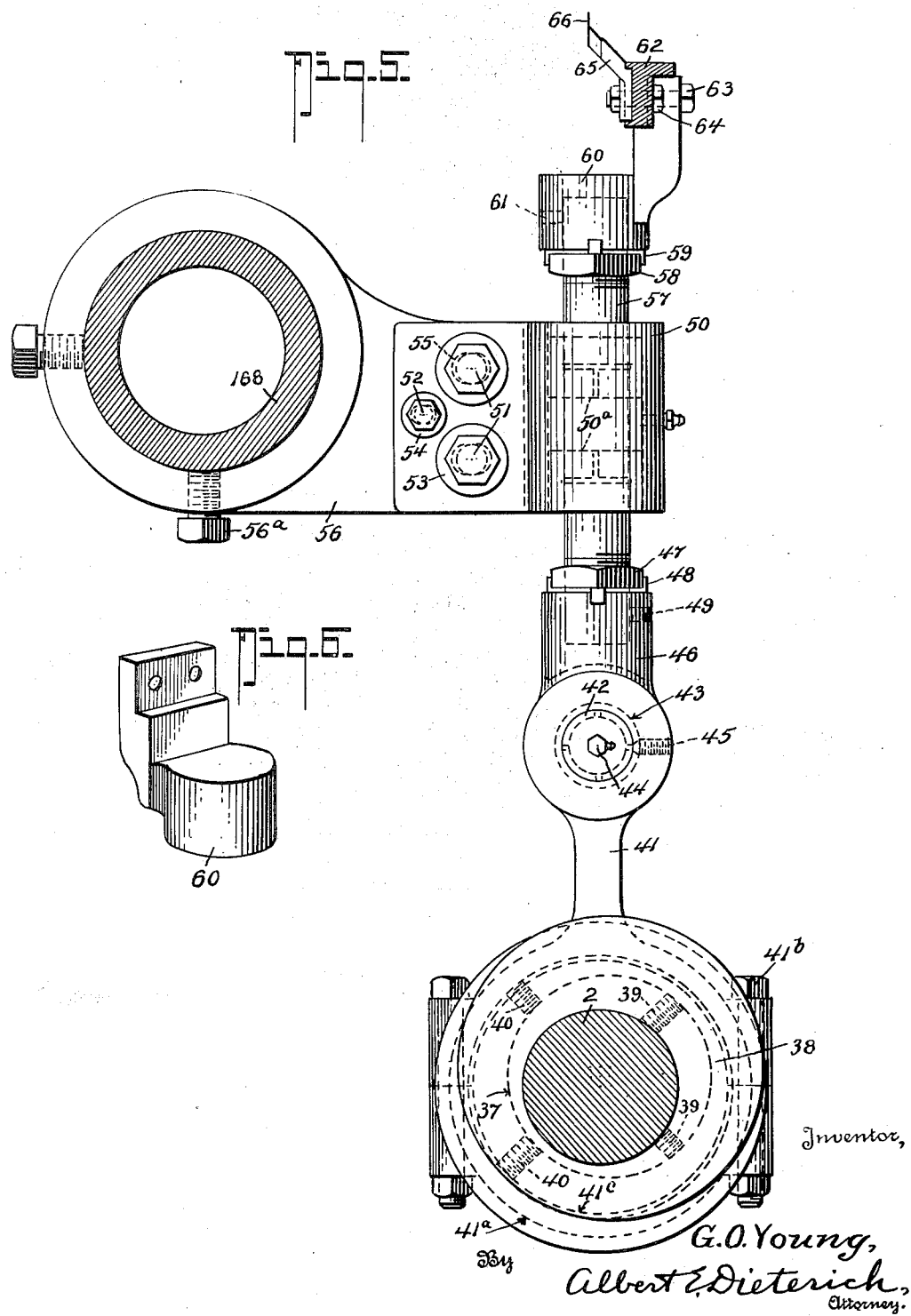

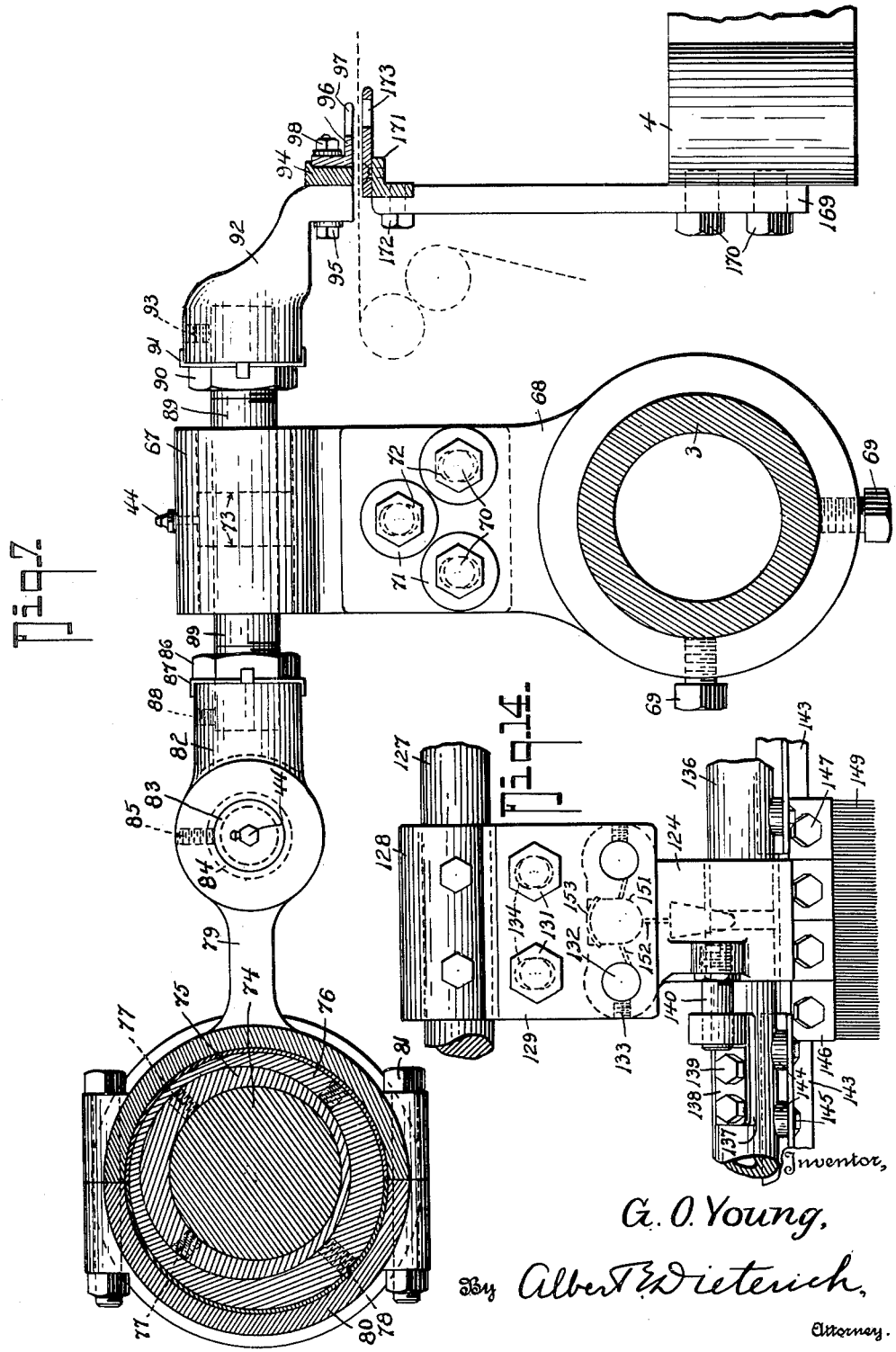

Aug. 30, 1949.  G. O. YOUNG  2,480,175
KNITTING MACHINE
Filed Aug. 2, 1944   16 Sheets-Sheet 6
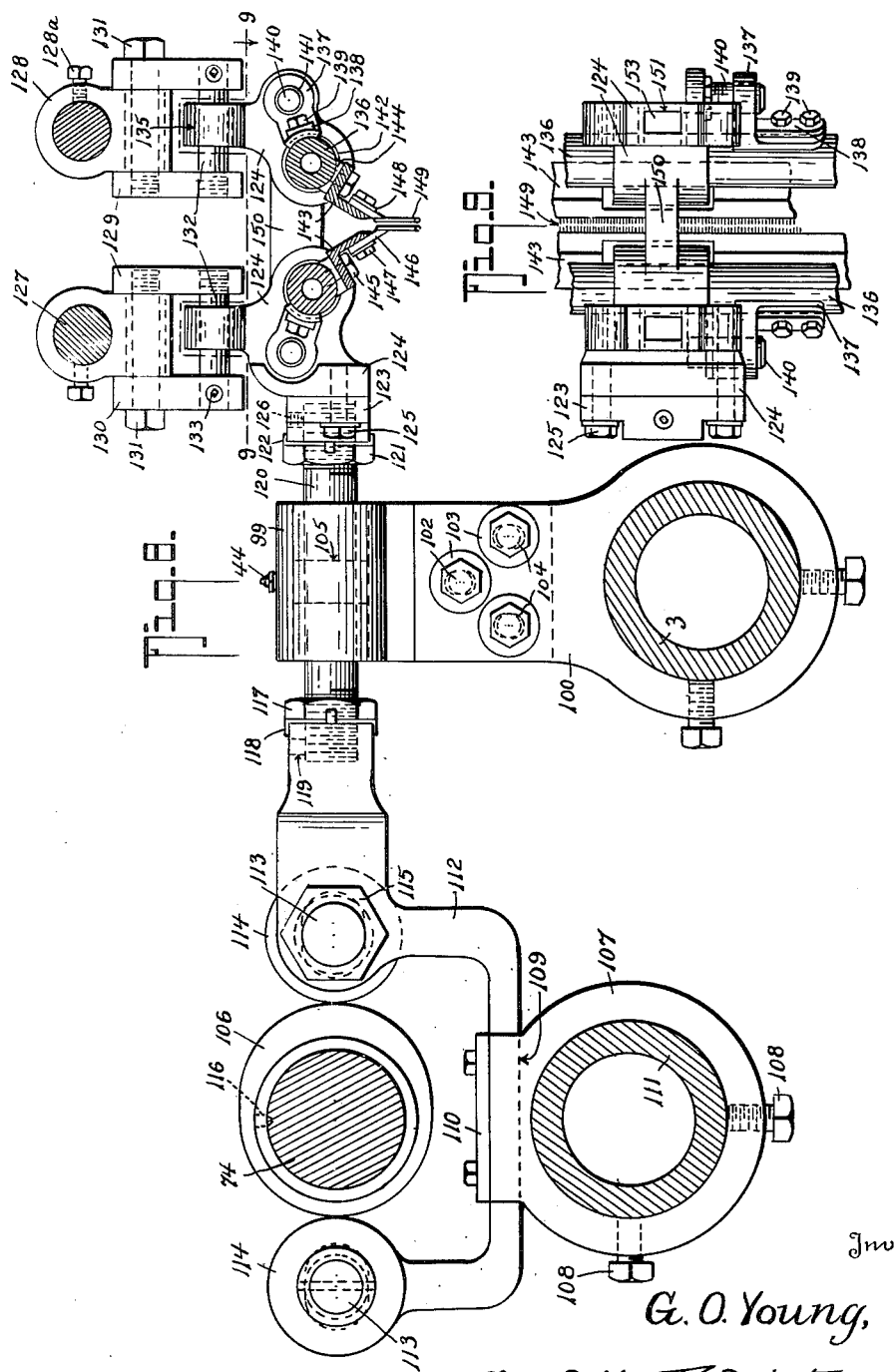

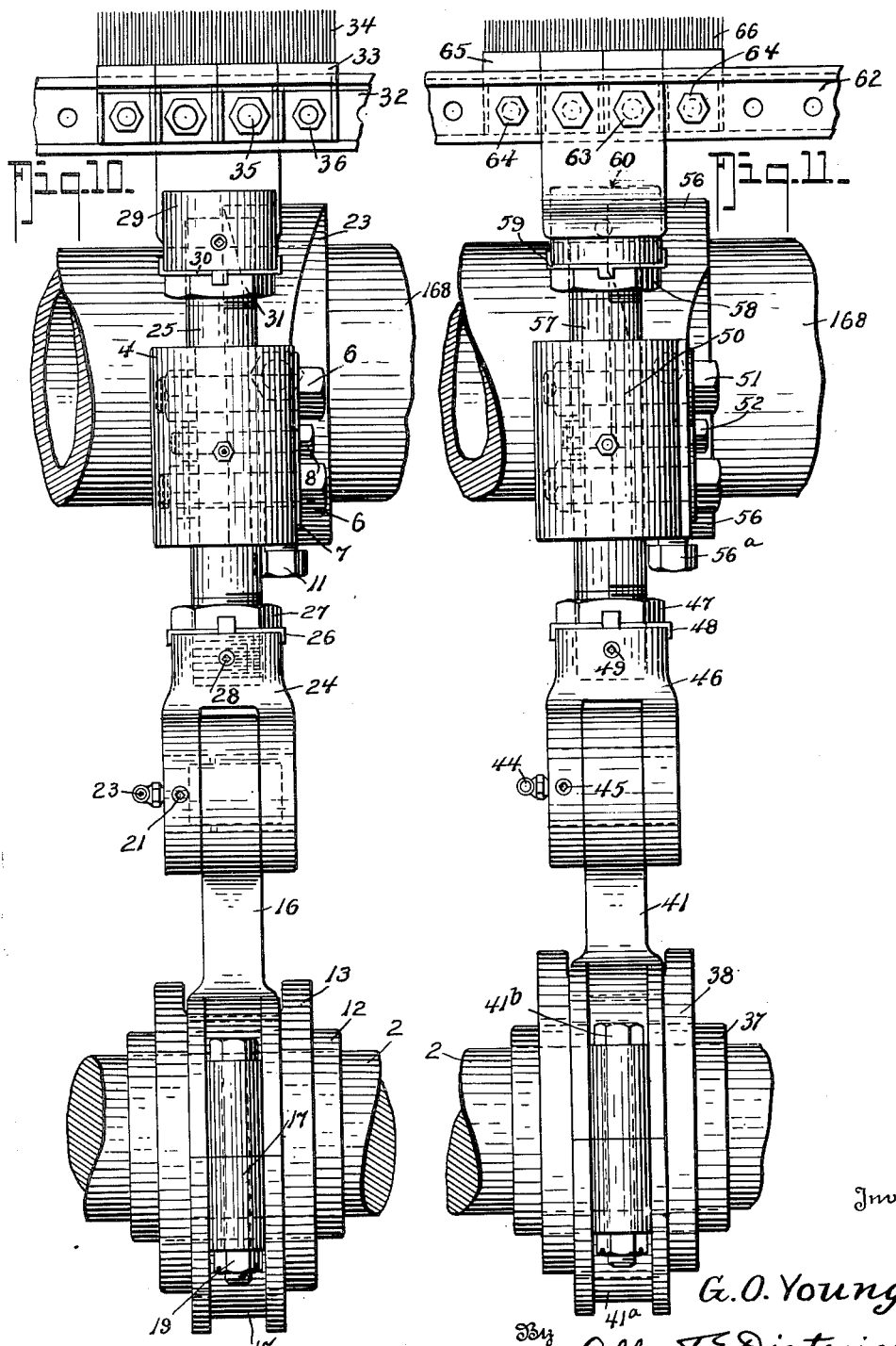

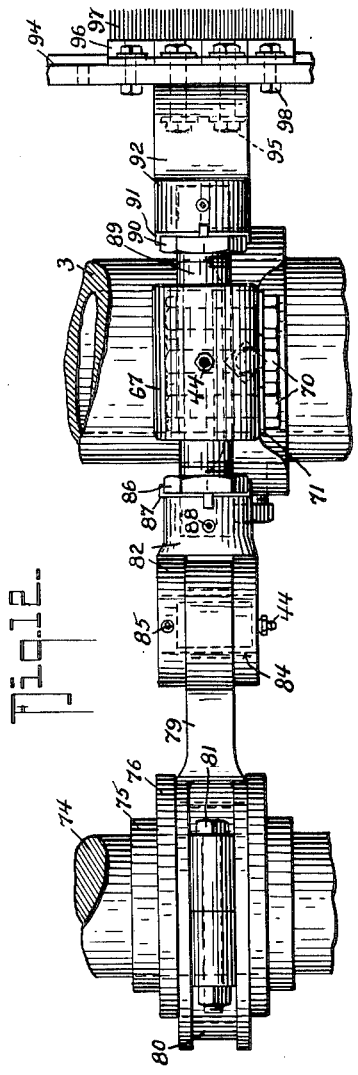
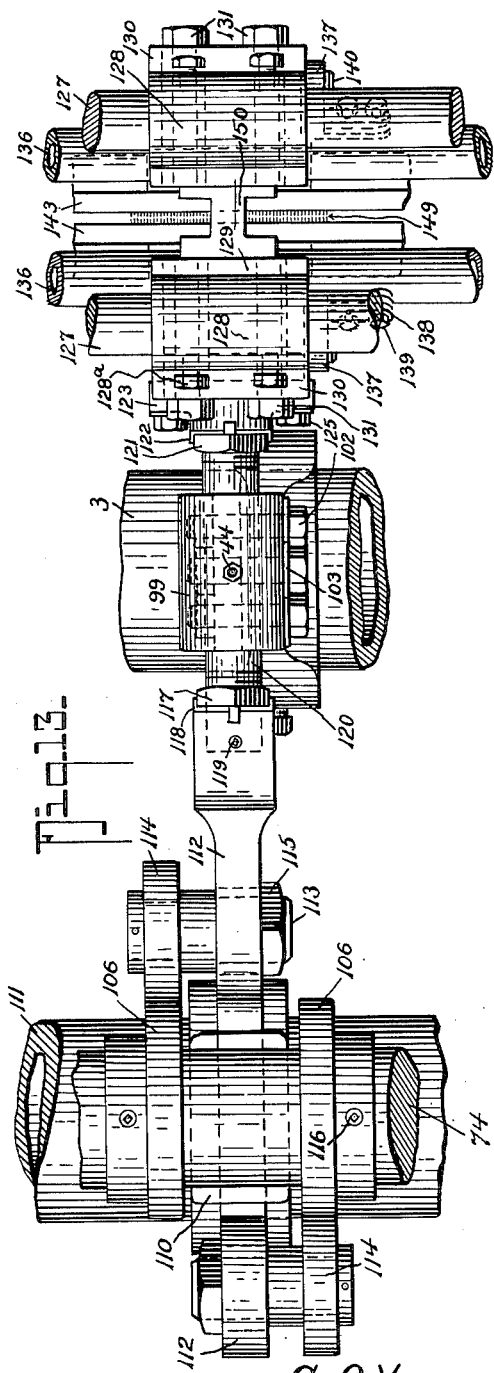

Aug. 30, 1949.　　　　G. O. YOUNG　　　　2,480,175
KNITTING MACHINE

Filed Aug. 2, 1944　　　　　　　　　　　　16 Sheets-Sheet 9

Inventor,
G. O. Young,
By Albert E. Dieterich,
Attorney.

Aug. 30, 1949.  G. O. YOUNG  2,480,175
KNITTING MACHINE
Filed Aug. 2, 1944  16 Sheets-Sheet 10
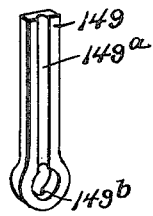
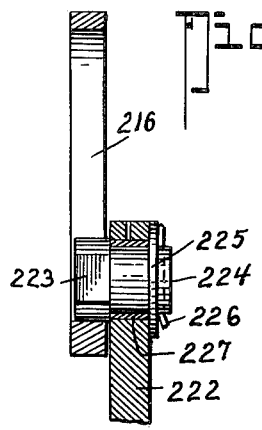
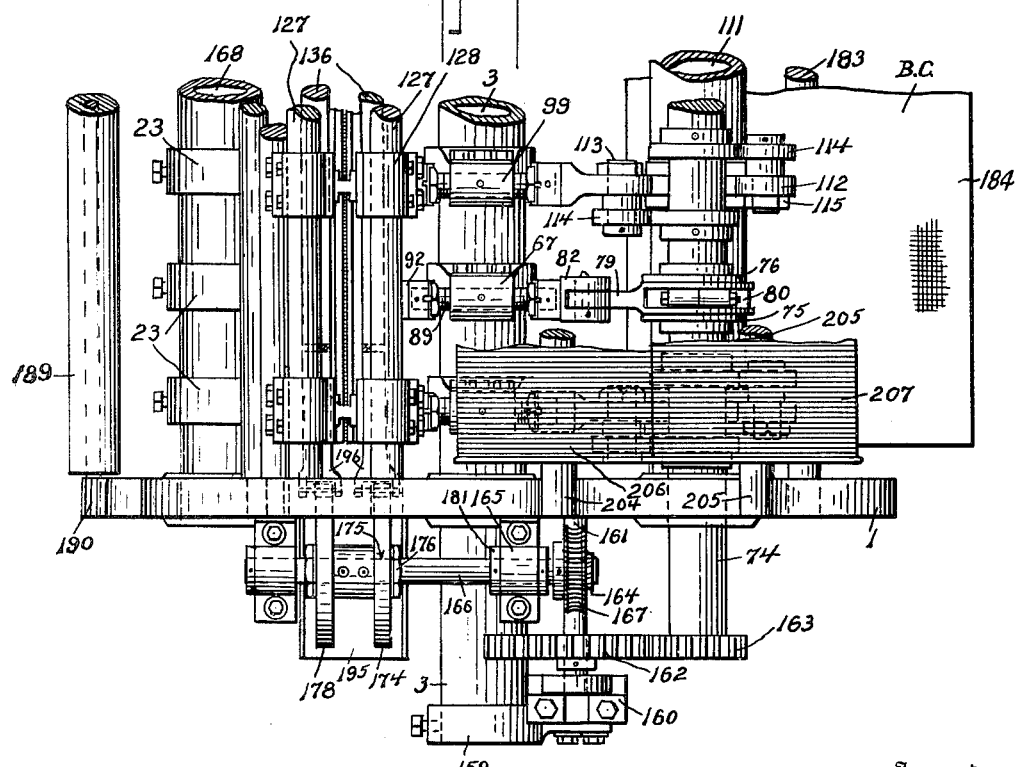
Inventor,
G. O. Young,
By Albert E. Dieterich,
Attorney.

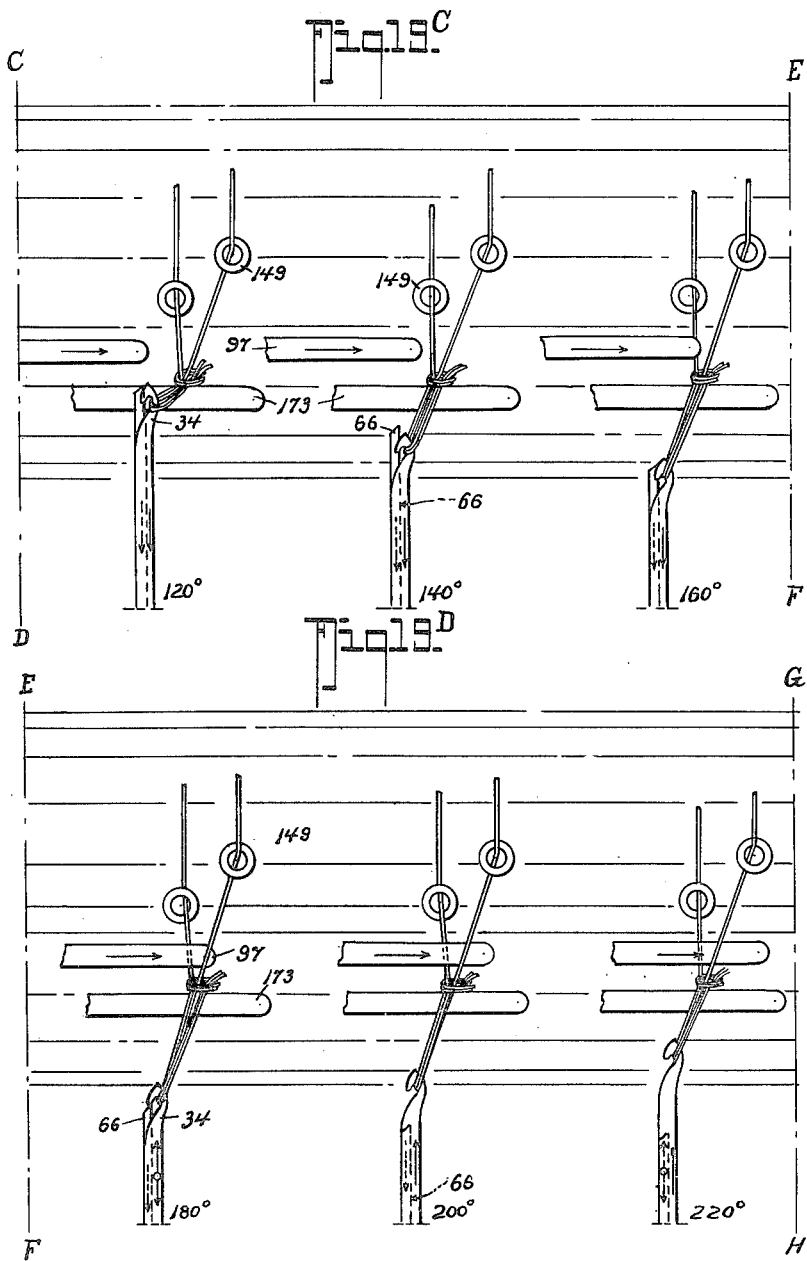

Aug. 30, 1949.  G. O. YOUNG  2,480,175
KNITTING MACHINE
Filed Aug. 2, 1944  16 Sheets-Sheet 14
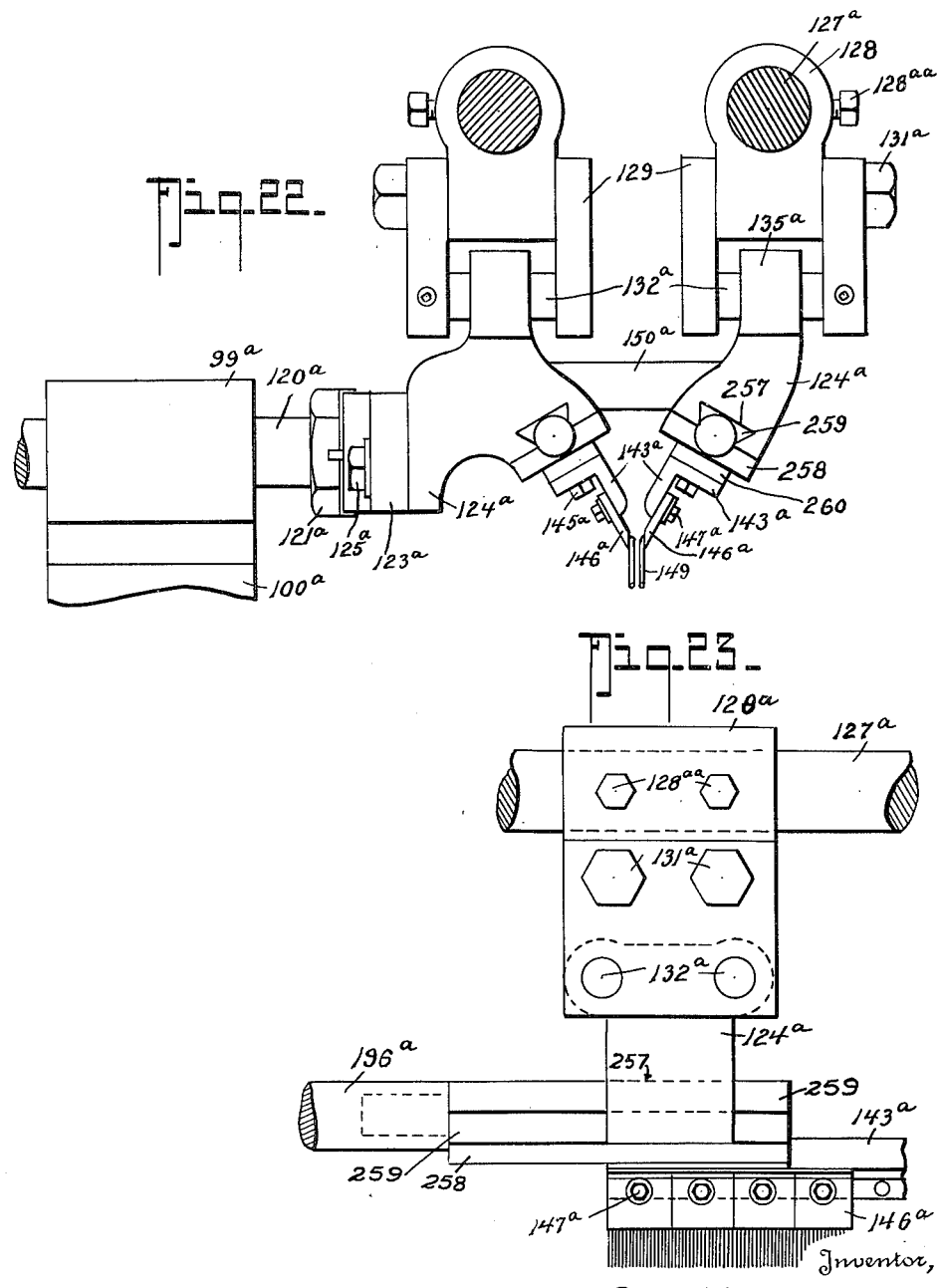
Inventor,
G. O. Young,
By Albert E Dieterich,
Attorney.

Aug. 30, 1949.  G. O. YOUNG  2,480,175
KNITTING MACHINE
Filed Aug. 2, 1944  16 Sheets-Sheet 15
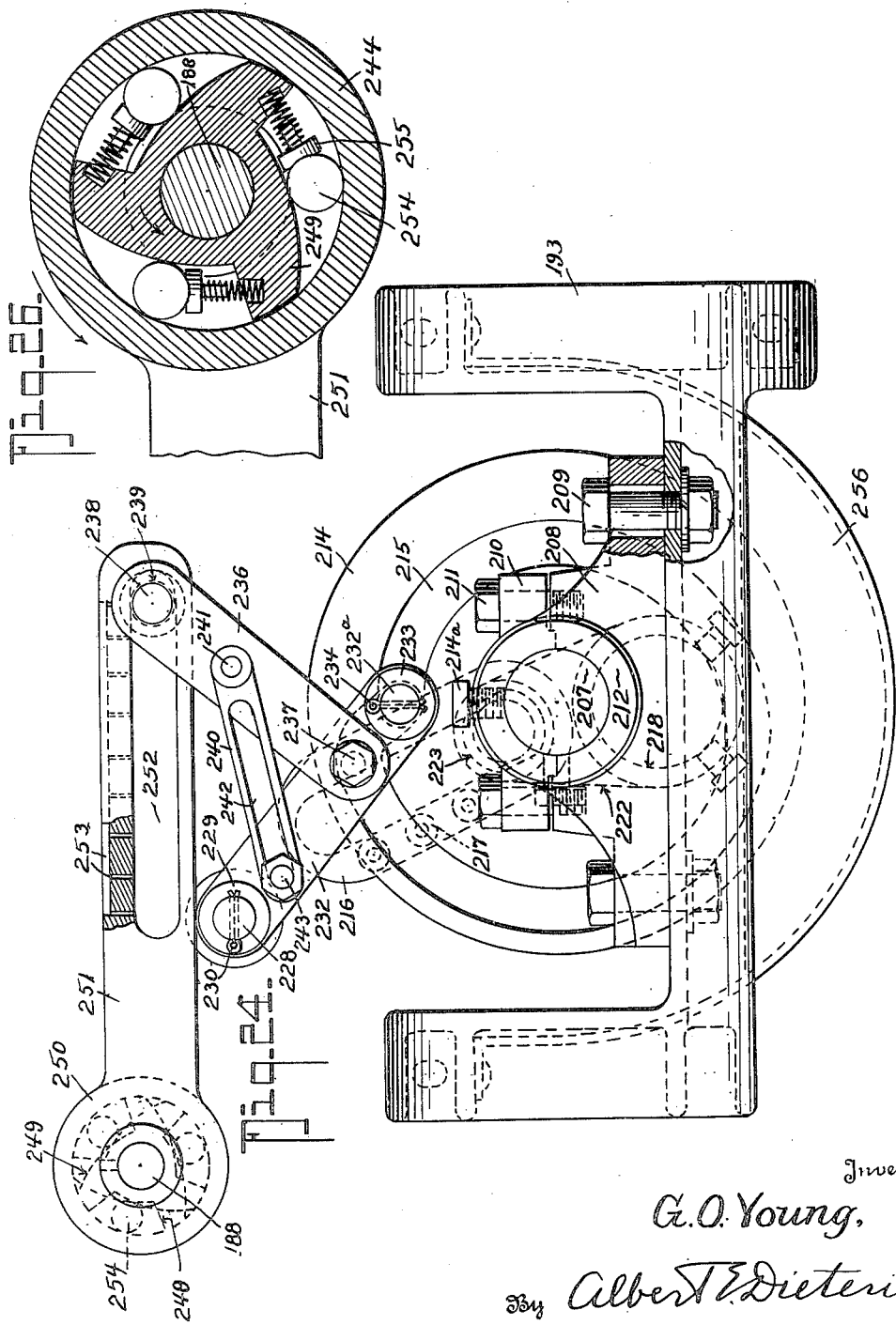
Inventor,
G. O. Young,
By Albert E. Dieterich,
Attorney.

Aug. 30, 1949.　　　G. O. YOUNG　　　2,480,175
KNITTING MACHINE
Filed Aug. 2, 1944　　　16 Sheets-Sheet 16
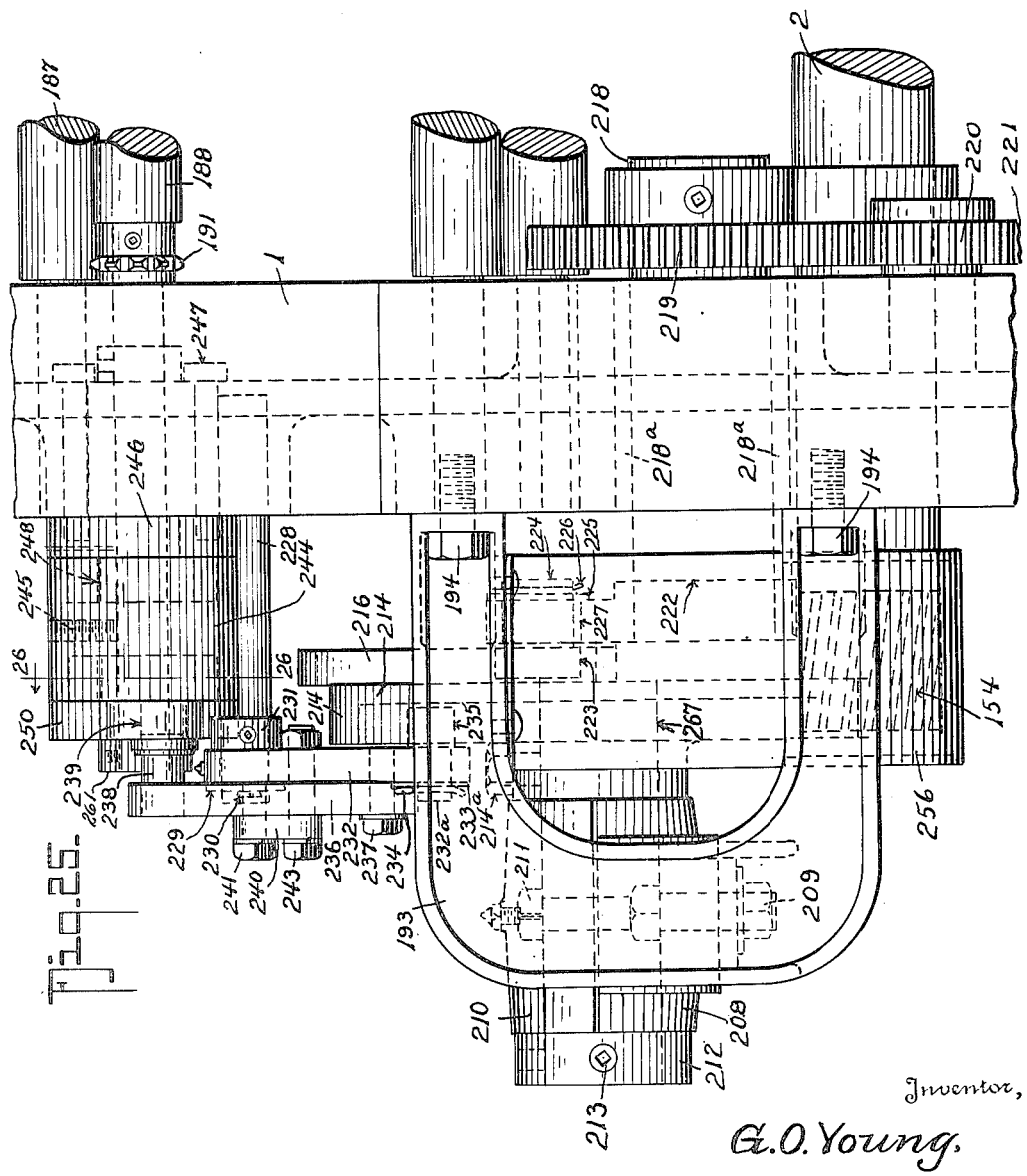

Patented Aug. 30, 1949

2,480,175

UNITED STATES PATENT OFFICE 2,480,175

KNITTING MACHINE

George O. Young, Robesonia, Pa., assignor to Vanity Fair Mills, Inc., Reading, Pa., a corporation of Pennsylvania Application August 2, 1944, Serial No. 547,702

35 Claims. (Cl. 66—86)

My invention relates to knitting machines of the so called straight or Tricot type and it particularly has for its object to so improve the construction of such machines as will enable them to be run at high speeds efficiently.

Another object is to provide a machine in which the movements of the needles, the needle co-operating tongues, the sinker nibs are effected by eccentrics by virtue of which the inertia forces at high speeds are distributed over considerable surface areas.

A further object is to provide new and improved warp thread guide mounting and racking mechanism, sinker-nib mounting and operating means, needle and tongue mounting and operating mechanism, parts of which are interchangeable, thus reducing cost of manufacture and maintenance.

A still further object is to provide means for feeding a base cloth between the sinkers and the sinker nibs in a manner to keep it taut where the needles pass through and to advance the cloth with each stitch of the needles in timed relation to the needle and tongue operations so that the advancing of the cloth takes place while the needles and tongues are clear of the cloth.

Other objects will in part be obvious and in part be pointed out hereinafter.

To the attainment of the aforesaid objects and ends the invention further resides in those novel details of construction, combination and arrangement of parts, all of which will first be described in detail hereinafter and then be specifically pointed out in the appended claims, reference being had to the accompanying drawings in which—

Fig. 1 is an end elevation of a knitting machine embodying my invention.

Fig. 2 is an end elevation of the opposite end of the same.

Fig. 3 is a detail cross-section showing a needle supporting and operating unit.

Fig. 4 is a detail horizontal section on the line 4—4 of Fig. 3.

Fig. 5 is a detail view similar to Fig. 3 showing a tongue supporting and operating unit.

Fig. 6 is a detail perspective view of a tongue-bar support.

Fig. 7 is a detail cross section showing a sinker-nib supporting and operating unit and showing a sinker and its support in operative position with respect to the sinker nib.

Fig. 8 is a view similar to Fig. 3 showing a thread guide supporting and operating unit.

Fig. 9 is a detail top plan view of a portion of the structure shown in Fig. 8.

Fig. 10 is an elevational view of the unit shown in Fig. 3.

Fig. 11 is an elevational view of the unit shown in Fig. 5.

Fig. 12 is a top plan view of the unit shown in Fig. 7.

Fig. 13 is a top plan view of the unit shown in Fig. 8.

Fig. 14 is a front elevational view of the thread guide bar head and the parts carried thereby as well as the guide bar supporting means.

Fig. 16 is a top plan view of a portion of the machine.

Fig. 17 is a detail view of a spring device for holding the pattern wheel-engaging rollers against the pattern wheels.

Fig. 18 is a detail view of the pattern wheels and the rollers and extension bars hereinafter specifically referred to.

Figure 19A:
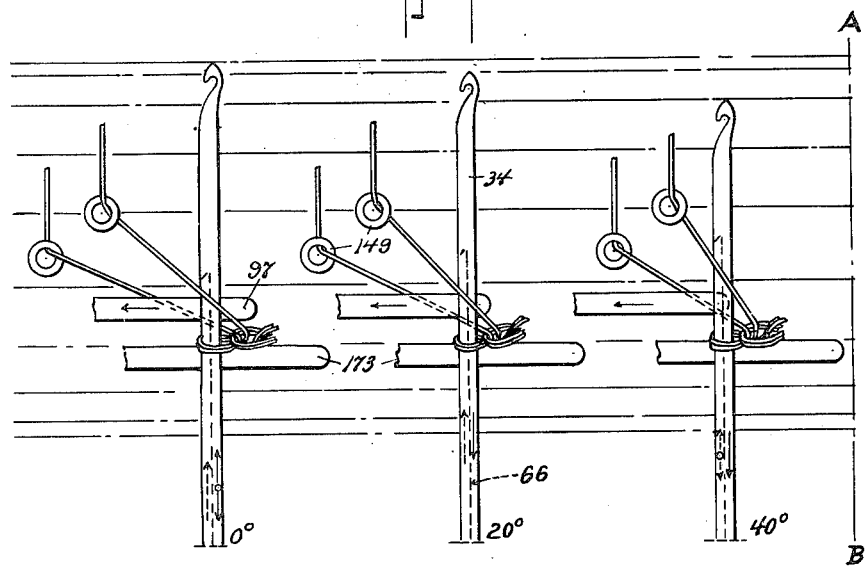
Figure 19B:
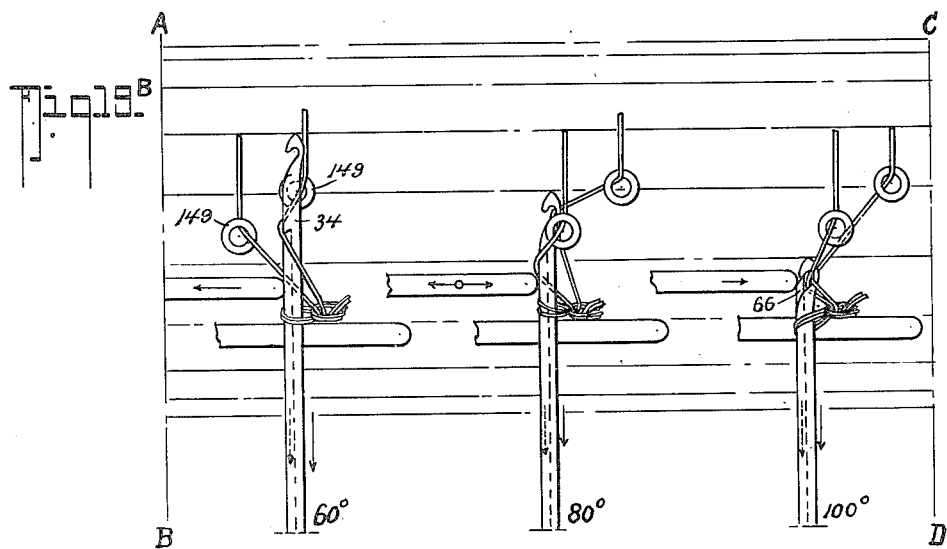
Figure 19E:
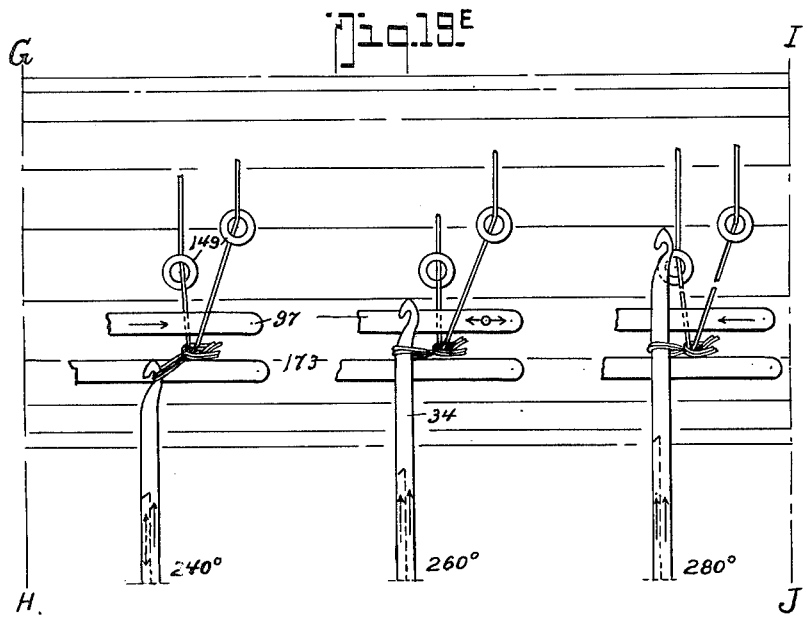
Figure 19F:
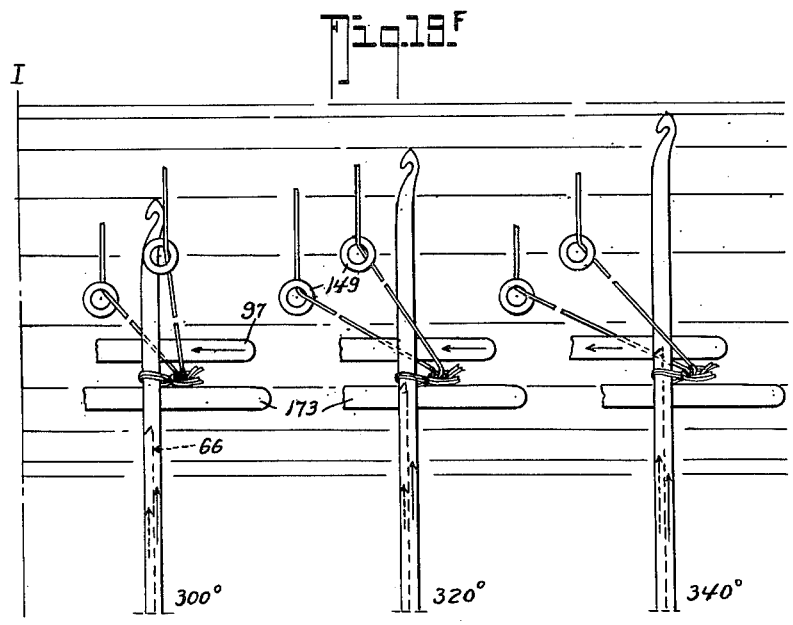

Figs. 19A, 19B, 19C, 19D, 19E, 19F, when joined on the lines A—B, C—D, E—F, G—H, and I—J, respectively, comprise a diagrammatic view of the relative positions at 20° intervals of the needles, the tongues, the sinkers and the thread guides through one cycle of operation.

Fig. 20 is a detail sectional view on the line 20—20 of Fig. 21.

Fig. 21 is an elevation of the parts shown in Fig. 20.

Fig. 22 is a view similar to Fig. 8 of a modification hereinafter referred to.

Fig. 23 is a side elevation of parts shown in Fig. 22.

Fig. 24 is an enlarged detail front elevation of the mechanism for feeding the base cloth.

Fig. 25 is a side elevation of the same.

Fig. 26 is a detail section on the line 26—26 of Fig. 25.

Fig. 27 is a detail view of the cloth feed roll connecting drive.

Fig. 28 is a detail perspective view of one of the thread guides.

Fig. 29 is a detail sectional view hereinafter referred to.

In the drawings like numerals and letters of reference indicate like parts in all the figures.

Mounted in suitable bearings in the frame 1 of the machine are two eccentric carrying shafts 2 and 74 which are connected together, to turn in unison by means of worms 154, and worms 155 on a counter shaft 156 mounted in suitable bearings 157 (see Fig. 2). Pipes or shafts 3, 3', 111 and 168 are secured rigidly in the frame 1 in any suitable way. The pipes 3, 3', and shafts 2 and 74 lie parallel to one another. The shaft 2 is the first motion shaft of the machine and from which all other parts are driven.

Mounted on the shaft 2 and pipe 168 are two or more, suitably spaced, needle-carrying and operating units one of which is clearly shown in Figs. 3, 4, and 10 to which reference is now made. Each needle-carrying and operating unit includes a needle plunger guide 4 having bearing bushings 5. The guide 4 is adjustably secured to a support 23 by cap screws and nuts 6 and 8, and washers 7 and 9, the screws passing through slots 10 in the guide 4. The support 23 is mounted on the pipe 168 and secured rigidly thereto by set screws 11. Mounted on and adjustably secured to the shaft 2 is an inner eccentric 12, adjustably secured by set screws 14, and an outer eccentric 13 which is adjustably secured to the inner eccentric 12 by means of set screws 15. A connecting rod 16 has a cap 17 secured to it by bolts 18 with nuts 19 and its bearing portion is bushed as at 16$^x$. The connecting rod 16 is bored to receive a bushing 22 and a hollow pin 20, the latter being secured in the furcations of a wrist pin housing 24 by means of a set screw 21. Screwed into the wrist pin housing is a hollow shaft or plunger 25, which is securely held to the said housing 24 by a nut 27, lock washer 26 and set screw 28. The shaft 25 passes up through the bushings 5. At its upper end it carries a needle bar support 29 that is screwed onto the shaft end and held in place by a nut 31 and lock washer 30. A needle bar 32 is secured to two or more needle bar supports 29 and extends along the length of the machine parallel to the shaft 2 and pipe 168. The needles 34, as is customary, are held in lead heads 33, the leads being secured in place on the bars 32 by cap screws 35 and nuts 36.

Referring now particularly to Figs. 5, 6 and 11 wherein is shown one of the tongue carrying and operating units, it will be seen that an inner eccentric 37 is adjustably secured to the shaft 2 by set screws 39; an outer eccentric 38 is adjustably secured to the inner eccentric by set screws 40. A connecting rod 41 has a cap 41$^a$ which is secured by bolts and nuts 41$^b$, the bearing face having a bushing 41$^c$. The connecting rod 41 is bored and bushed as at 43 to fit the hollow wrist pin 42. The wrist pin 42 is secured in the furcations of a wrist pin housing 46 by means of a set screw 45. Threaded into the wrist pin housing 46 and secured by a nut 47, lock washer 48 and set screw 49 is a hollow shaft 57 that passes through bearing bushings 50$^a$ in a tongue-plunger guide 50. The guide 50 is adjustably secured to a tongue-plunger guide support 56 by cap screws 51, 52 with nuts, and washers 53, 54, the screws passing through slots 55 in the guide 50. The tongue-plunger-guide support 56 is secured to the pipe 168 by set screws 56$^a$. On the upper end of the hollow shaft or plunger 57 is screwed a tongue-bar support 60 which is rigidly held in place by a nut 58, lock washer 59 and set screw 61. A tongue-bar 62 is secured to the supports 60 of two or more units by cap screws 63. The tongues 66 are mounted in leads 65 through which the cap screws 64 pass and secure the leads rigidly to the tongue-bar 62. It will of course be understood that two or more of the tongue-supporting and operating units are employed in the machine.

Referring to Figs. 7 and 12 it will be observed that a sinker-nib-plunger guide 67 is adjustably secured to a sinker-nib-plunger-guide support 68 by cap screws 70 with nuts, and washers 71, the screws passing through slots 72 in the guide 67. The support 68 is secured by set screws 69 to the pipe 3. The guide 67 has bushings 73 in which the hollow shaft or plunger 89 moves. An inner eccentric 75 is secured, adjustably, to the shaft 74 by set screws 77, while an outer eccentric 76 is adjustably secured to the inner eccentric 75 by set screws 78. A connecting rod 79 has a cap 80 secured to it by bolts and nuts 81. A wrist pin housing 82 carries a hollow wrist pin 83 on which the connecting rod is hinged. The pin 83 is secured in the furcations of the housing 82 by a set screw 85, the connecting rod 79 being bushed as at 84.

The plunger 89 is screwed into the housing 82 and is secured by a nut 86, lock washer 87 and set screw 88. A sinker-nib-bar support 92 is screwed on the forward end of the plunger 89 (hollow shaft) and secured by a nut 90, lock washer 91 and set screw 93.

The sinker-nib-bar 94 is secured to the supports 92 of two or more units by bolts and nuts 95. The sinker-nib leads 96 are secured to the bar 92 by bolts and nuts 98. The sinker-nib blades 97 are set in the leads 96 in the usual way. The sinker-nib leads 96 and the sinker-nib blades 97 comprise the sinker-nibs later referred to.

As shown in Fig. 7, the sinkers 173 are mounted on a sinker bar 171 that is attached at 172 to a sinker-bar support 169 that is fastened at 170 to the stationary guide 4.

Figure 15:
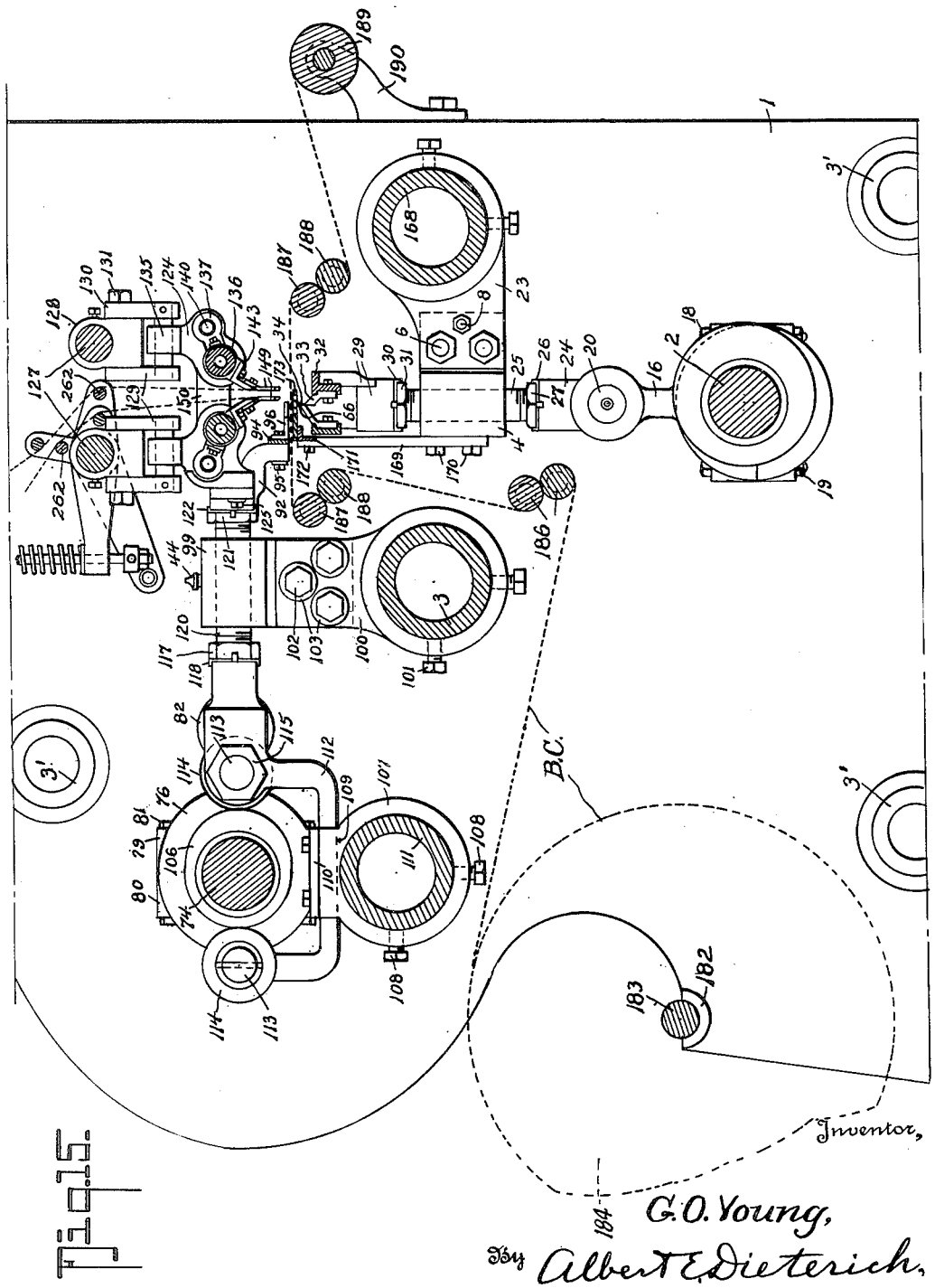
Fig. 15 is an assembly view of the units shown in Figs. 3, 5, 7 and 8.

Referring now to Figs. 8, 9, 13, and 15 it will be seen that on the pipe 3 is secured, by set screws 101, a thread-guide-plunger-guide support 100, to which a thread-guide-plunger guide 99 is adjustably secured by cap screws 102 with nuts, and washers 103, the screws passing through slots 104 in the plunger guide 99. The guide 99 has bushings 105 in which the hollow shaft or plunger 120 moves.

Secured to the shaft 74 by set screws 116 are cams 106. Fastened by set screws 108 on pipe 111 is a sliding roller-carriage support 107 having a slideway 109 and cap plate 110. A roller carriage slides in the way 109 and carries rollers 114 which are mounted on studs 113 and engage the cams 106. The studs pass through slots in the carriage 112 and are secured by nuts 115.

The plunger 120 is screwed into the carriage 112 and is secured by a nut 117, lock washer 118 and set screw 119. The other end of the plunger is screwed into a guide-bar support 123 which is secured by a nut 121, lock washer 122 and set screw 126.

A guide-bar head comprising a front and a back element or member 124 connected by a bridge bar 150, is secured to the support 123 by cap screws 125. The front and back members 124 of the guide-bar head have bushed bearings 135 to ride on pins 132 carried by guide-bar-slider plates 129 and 130, and secured by set screws 133. The slider plates 129, 130 are tightly but adjustably secured to a spacer 128 by cap screws 131 which pass through slots 134 in the spacer 128. The spacers 128 are secured to guide-bar-head-supporting shafts 127 by set screws 128$^a$. The shafts 127 are fixedly mounted in and secured in the frame 1 of the machine.

The guide-bar head has its front and back members 124 fitted with bearing bushings 142 for the guide-bar-racking shafts 136 to slide in. A guide-bar slider 137 is adjustably secured to each shaft 136 by cap screws 139 and adjusting spacers 138. The sliders 137 have bushed bearings 141 to receive the slider pins 140 which are securely mounted on the heads 124 and prevent swivelling of the shafts 136.

143 designates the thread guide bars, one of which is mounted on each shaft 136 by means of spacers 144 and cap screws 145. The guide bars 143 are cut-away in order to pass the members 124 the cuts being long enough to allow racking of the bars. Thread guides 149 have their leads 146 secured to the guide bars 143 by screws 147 carrying washers 148.

The guide-bar head 124 has its members provided with lubricant holding pockets 151 from which oil ducts 152 lead to the bushed bearings 135, covers 153 being provided for the pockets 151 as best shown in Fig. 14.

The guides 149 are preferably provided with grooves 149a, 149b in which the thread may lie to eliminate danger of the needle hook snagging the thread during the movements of the guides from front to back and vice versa.

Referring to Fig. 2 it will be seen that one end of each shaft 2 and 74 has a worm 154 cut in it. The worms 154 mesh with worms 155 on a counter shaft 156 that is journalled in suitable bearings 157 on one end frame 1. Thus the two shafts 2 and 74 turn in unison and at the same speed.

Referring to Figs. 1, 16, 20 and 21 it will be observed that the end frame, at the end opposite that shown in Fig. 2, has secured to it a bearing 158 in which, and in a bearing 160 mounted on an arm 159, is a short shaft 161. The arm 159 is secured to the pipe 3. A spur gear 162 is secured to the shaft 161 and meshes with a spur gear 163 on the shaft 74. The shaft 161 also carries a worm 164 which meshes with a worm gear 167 on a pattern wheel shaft 166. The shaft 166 is journalled in suitable bearing brackets 165 that are mounted on the end frame 1.

The pattern wheels 174 and 178 are mounted on split hubs 175 and 179, respectively, through which, and a suitable spacer 177 the shaft 166 passes (see Fig. 18). The pattern wheels are secured in place on the shaft 166 by nuts 176, 180, respectively. Thrust collars 181 prevent the shaft 166 moving endwise while the machine is in operation. A drip pan 195 is provided beneath the pattern wheels as shown.

As best shown in Figs. 16 and 18, each guide bar 136 has a forked extension 196 to which the guide bar is adjustably connected by a right and left threaded bolt 197. In the forks 198 of these extensions 196 are pins 200 on which are rollers 199 that are pressed continuously against the pattern cams by springs 202 (see Figs. 2 and 17) attached to the guide-bar arms 201 and secured to an end frame 1 as at 203.

The frames 1 have bearings 1a for the shafts 204 and bearings 1b for the shafts 205. The thread from the beams 206 passes over guide rods 262 of spring tension devices of known construction.

Referring now particularly to Figs. 2, 15, 24, 25, 26 and 27, it will be seen that I have provided a new and improved means for feeding the base cloth B. C. forwardly step-by-step the very small distances required between each needle operation to ensure a uniform spacing of the stitches through the base cloth. As the cloth feeding rolls 187 and 188 must be turned only a very short distance with each operation of the needles it has been found almost impossible to effect this turning operation by direct gear drive between the main shaft of the machine and the cloth feeding rolls and I have therefore devised the cloth feeding mechanism now to be described.

The base cloth roll 184 has its shaft 183 mounted in saddle bearings 182 (Fig. 1). The base cloth passes around guide rolls 186 to the cloth-feed rolls 187, 188 and from thence to the take-up roll 189 which is carried by brackets 190. The rolls 188 are connected by the chain 192 passing over sprockets 191.

In the figures of the drawing last above referred to, 193 indicates an extension bracket which is mounted firmly on the end frame 1 by cap screws 194. Mounted in a bearing 208 that is secured to the bracket 193 by bolts 209 is an auxilliary cam shaft 207. The shaft 207 is held against longitudinal or axial movement by a collar 212 at one end and by a cam wheel 214 that is secured to its other end. A set screw 213 holds the collar in place while another set screw 214a holds the cam wheel to the shaft. A bearing cap 210, held in place by cap screws 211, completes the bearing for the shaft 207.

Fastened by countersunk screws 217 on the back of the cam wheel 214 is a slotted cam arm 216.

A short shaft 218 is mounted in a bearing 218a in the main frame 1 and carries a slotted crank arm 222 and a gear 219. The gear 219 meshes with an idler gear 220 that in turn meshes with a gear 221 on the main shaft 2 of the machine. A slide 223, having a stub shaft 224 mounted to turn in a bearing 227 in the arm 222, operates in the slot of arm 216. A washer 225 and cotter pin 226 serve to hold the stub shaft 224 in place.

Pivotally mounted on a stationary shaft 228 is an arm 232. The arm is held on the shaft 228 by means of a collar 231, washer 229 and cotter pin 230. A cam roller 235, rotatable on a pin 232a that is secured to the end of the arm 232 by a washer 233 and cotter pin 234, rides in the cam groove 215. An eccentric arm 236 is pivoted at 237 to the arm 232 and carries a connecting pin 238 having a roller 239 that works in a slot 252 in an arm 251 later again referred to. The arm 236 is connected adjustably with arm 232 by a slotted link 240 and bolts and nuts 241 and 243, the bolt 243 passing through the slot 242 in the link 240.

Secured to the main frame 1 by cap screws 247 is a stationary ring 246 that carries the stationary clutch member 248. A clutch raceway 244 receives the member 248 and also receives a second clutch member 249, the latter being secured to a movable ring 250. The shaft of the cloth feed roller 188 passes through the several elements 246, 248, 249 and 250 and carries a collar 261 which holds these elements assembled. A set screw 245 secures the raceway 244 to the shaft 188 (see Fig. 25). The movable ring 250 carries the arm 251 hereinbefore referred to. The arm 251 has an oil groove which communicates with the slot 252 by means of a series of ducts 253. Rollers 254 operatively connect the raceway 244 with respective clutch members 248 and 249 and are held in operative position by spring pressed centering pins 255.

An oil pan 256 is mounted on the bracket 193.

As the shaft 218 is turned the crank arm 222 will turn the cam wheel 214 which wheel in turn will rock the arm 232 on its pivot 228. As arm 232 and arm 236 are rigidly connected together by link 240, the rocking motion of arm 232 is transmitted to arm 251 which is in turn rocked on the axis of the roller 188. Movement of the arm 251 in one direction only is imparted to the clutch raceway 244 and consequently to the roller 188. Clutch 249, 254, 244 (Fig. 26) operates only in one direction while clutch 248, 254, 244 operates as a back check device only. By shifting the connection 243 with link 240 the angle between arms 232 and 236 can be changed to vary the length of the cloth steps of movement as may be desired.

The pair of rolls 188 are connected together by a sprocket and chain connection 192 as shown in Fig. 27, so as to keep the cloth taut where it passes over the sinkers.

Instead of using tubular shafts or rods 136 for racking the thread guides, the guide-bar-heads 124a (see Figs. 22 and 23) may have dove-tail slots 257 in which the dove-tails 259 of blocks 258 slide. Spacers 260 are provided between the blocks 258 and the guide bars 143a.

In this modification the extension members 196a are connected to the end blocks 258 at one end of the machine and the springs 202 are attached to the end blocks 258 at the other end of the machine. In Figs. 22 and 23 those parts which correspond to similar parts in the preceding figures bear the same reference numbers plus the index letter $a$.

Referring now to Fig. 19 (composed of Figs. 19A, 19B, 19C, 19D, 19E, and 19F) it will be seen that Fig. 19 diagrammatically illustrates the movements and relative positions of the needles, the tongues, the sinker-nibs and the thread guides. The sinkers are stationary. At position 0° the needles will have reached the upward limit of their strokes and for an instant are motionless; the tongues will be moving upwardly; the sinker-nibs will be moving back or receding. The thread guides are in back of the needles and are racked during the first 20° interval.

As the parts move from the 0° position toward the 20° position (Fig. 19A) the needles are moving down, the tongues are moving (at a slower linear speed than the needles) upwardly, the sinker-nibs are receding and the thread guides (having racked) are moving toward the front (left to right in Fig. 19A) of the needles. These movements continue until the 40° position is reached at which time the tongues will have reached the upper limit of their movements and have momentarily come to rest. In passing from the 40° position though the 60° position to the 80° position, the downward movements of the needles and tongues continue, the rearward movement of the sinker-nibs comes to an end by the time the 80° position is reached, this being the dead center point of the eccentric. The nib then starts to move towards the right and at the 100° position is the same distance from the center line of the needle as it was in the 60° position.

The downward movement of the tongues from the 40° position is at a slower rate than that of the needles. In passing from position 80° (Fig. 19B) the needles hook both threads and by the time position 100° is reached the tongues will have closed the hooks of the needles. In passing from the 100° position to the 120° position, the needles will draw the threads through the previously formed loops and the previously formed loops will be knocked over. Also the sinker-nibs will be moving forward. The downward movements of the needles and tongues continue (the needles moving faster than the tongues) until the 180° position is reached, at which time the needles will have reached their lowest point and will thereafter begin to rise again. The sinker-nibs continue to move forward from position 100° to position 260°.

The thread guides rack, at position 120°, in back of the needles. The racking may be extended over approximately 35° which is a decided advantage in a high speed machine.

In passing from the 120° position the sinker-nibs advance between the threads to hold down the cast off loop (Figs. 19C, 19D).

On leaving position 180° the needles move upward while the tongues continue downward at a slower speed until position 220° is reached, at which time the tongues will have reached the lower limit of their movement and momentarily come to rest. The thread guides remain substantially at rest from position 100° to position 260°. The sinker-nibs reach their farthest forward position at 260°. The needles and tongues (the needles moving faster than the tongues) continue moving upwardly.

After passing position 260° the thread guides start on their rearward journey, passing the needles on the opposite sides thereof than they did when the guides moved forwardly. From position 260° the sinker-nibs move backwardly.

From the foregoing it will be seen that a complete cycle of the needles is from position 0° through position 180° to position 360° (0°); a complete cycle of the tongues is from position 40° through position 120° to the starting position again; a complete cycle of the sinker-nibs is from position 80° though position 260° to position 80°; while a complete cycle of the thread guides is from position 0° through position 180° to position 0° again.

In the diagrammatic Figure 19 no base cloth is indicated as this figure is intended to illustrate the knitting function per se.

It can be seen from Figures 19A through 19D that the machine can be used as a straight tricot knitting machine. If it is found that the pointed needle (which is necessary when knitting through base cloth) presents difficulties, as far as knock over etc. are concerned, it may be replaced with a needle that has no point.

When knitting through a base cloth or any other material that may be penetrated with a needle, it is necessary to have the needle pointed, as shown, in order to facilitate this penetrating process. The position of the loops on the top of the base material, which will lie between the stationary sinkers and the movable nibs, will depend only on whether the base material is moving or is stationary. Figures 19A to 19D show the approximate position of the knitted loops when no base material is used, which is the case when operating as a straight tricot machine.

Fabric such as that disclosed, for example, in the patent to Roy C. Amidon #2,136,368, issued November 15, 1938, may be knit by the machine of my present application.

During the time the needles are below the base cloth B. C., the arm 251 is rocked one up stroke to advance the cloth one step, i. e. as soon as the needles reach position 120° in Fig. 19C. During the remainder of the cycle of the needles the shafts 188 remain stationary and no advance of the base cloth takes place.

The complete fabric take-up or receiving roll 189 may be operated by the usual pulley, rope and weight, not shown as such means is conventional and not a part of my invention.

While I have disclosed a preferred embodiment of my invention it will be obvious that changes in the details of construction may be made without departing from the spirit of the invention.

From the foregoing description taken in connection with the accompanying drawings it is thought the complete construction, operation and advantages of my invention will be clear to those skilled in the art.

What I claim is:

1. In a flat knitting machine wherein are employed knitting needles and tongues, needle operating means which includes reciprocating plungers and guides therefor, sinkers and sinker-bar supports: the improvement which comprises a single supporting pipe and means for mounting said guides and said sinker-bar supports on said supporting pipe.

2. In a flat knitting machine wherein are employed knitting needles and tongues therefor, stationary sinkers, means for supporting and operating said needles and tongues, means for supporting said sinkers, movable thread guides and movable sinker-nibs: the improvement which comprises sinker-nib carrying and operating means, thread guide carrying and operating means, said last two mentioned means each including a reciprocatable plunger, a single shaft having supports with bearings for said plungers, thereby in part supporting said sinker-nib carrying and operating means and said thread-guide carrying and operating means, and a second shaft and means carried by the said second shaft for in part supporting said sinker-nib and said thread-guide operating means.

3. In a flat knitting machine wherein are employed knitting needles, tongues for the needles, sinkers, sinker-nibs and thread guides with means for carrying the same: the improvement which includes a frame; a first supporting shaft carried by the frame on which shaft the needle and tongue-carrying means are mounted; a second supporting shaft on which the thread-guide-carrying and the sinker-nib-supporting means are mounted; a first rotatable shaft; needle and tongue operating eccentrics on said first rotatable shaft; connections between said eccentrics and the needle and tongue carrying means respectively; a second rotatable shaft; sinker-nib-operating eccentrics on said second rotatable shaft; connections between the last named eccentrics and the sinker-nib-carrying means; cams on said second rotatable shaft; connections between the last named cams and said thread guide-carrying means; and an operative connection between said rotatable shafts.

4. In a flat knitting machine wherein are employed knitting needles, tongues, sinkers, sinker-nibs, thread guides, needle carrying means, tongue carrying means, sinker supports, sinker-nib carrying means, and thread guide carrying means: the improvement which includes mechanism to operate said needles, said tongues, said sinker nibs, and said thread guides, said mechanism including a first rotatable shaft and operating connections between the same and said needles and said tongues, a second rotatable shaft and operating connections between said second rotatable shaft and said sinker nibs and said thread guides.

5. In a flat knitting machine the improvement which comprises a rigid supporting shaft; a needle plunger guide support rigidly mounted on said shaft; a needle plunger guide secured to said needle plunger guide support; a plunger reciprocatively mounted in said needle plunger guide; a needle bar support carried by said plunger; a needle bar secured to said needle bar support; knitting needles carried by said needle bar; and needle operating means connected to said plunger for reciprocating the same.

6. The improved knitting machine according to claim 5 wherein the needle operating means includes an eccentric-carrying shaft and a connection between the eccentric of said eccentric-carrying shaft and the needle plunger.

7. In a flat knitting machine the improvement which comprises a rigid supporting shaft; a tongue plunger guide support rigidly mounted on said shaft; a tongue plunger guide secured to said tongue plunger guide support; a plunger reciprocatively mounted in said tongue plunger guide; a tongue bar secured to said plunger; needle cooperating tongues mounted on said tongue bar; and tongue-operating means connected to said plunger for reciprocating the same.

8. The improved knitting machine according to claim 7 wherein the tongue operating means includes an eccentric-carrying shaft and a connection between the eccentric of said eccentric-carrying shaft and the tongue plunger.

9. In a flat knitting machine the improvement which comprises a rigid supporting shaft; a needle plunger guide support rigidly mounted on said shaft; a needle plunger guide secured to said needle plunger guide support; a plunger reciprocatively mounted in said needle plunger guide; a needle bar support carried by said plunger; a needle bar secured to said needle bar support; knitting needles carried by said needle bar; and needle operating means connected to said plunger for reciprocating the same; a tongue plunger guide support rigidly mounted on said shaft; a tongue plunger guide secured to said tongue guide support; a plunger reciprocatively mounted in said tongue plunger guide; a tongue bar secured to said plunger; needle cooperating tongues mounted on said tongue bar; and tongue-operating means connected to said plunger for reciprocating the same.

10. In a flat knitting machine: the improvement which comprises a rigid supporting shaft; a needle plunger guide support rigidly mounted on said shaft; a needle plunger guide secured to said needle plunger guide support; a plunger reciprocatively mounted in said needle plunger guide; a needle bar support carried by said plunger; a needle bar secured to said needle bar support; knitting needles carried by said needle bar; needle operating means connected to said plunger for reciprocating the same, said needle operating means including an eccentric-carrying shaft and a connection between the eccentric of said eccentric-carrying shaft and said plunger for operating the same; a tongue plunger guide support rigidly mounted on said supporting shaft; a tongue plunger guide secured to said tongue plunger guide support; a plunger reciprocatively mounted in said tongue plunger guide; a tongue bar carried by said plunger; needle cooperating tongues mounted on said tongue bar; and tongue-operating means connected to said plunger for reciprocating the same.

11. The improved knitting machine according to claim 10 wherein the tongue operating means includes an eccentric-carrying shaft and a connection between the eccentric of said eccentric-carrying shaft and said plunger for operating the same.

12. In a flat knitting machine wherein are employed knitting needles and needle-supporting and operating mechanisms, tongues and tongue-supporting and operating mechanisms, sinkers, sinker-nibs, thread guides and thread guide-supporting and operating mechanisms: the improvement which comprises a rigid supporting shaft; a sinker-nib-plunger guide support rigidly mounted on said shaft; a sinker-nib-plunger guide carried by said sinker-nib-plunger guide support; a plunger reciprocatively mounted in said sinker-nib plunger guide; a sinker-nib bar mounted on said sinker-nib plunger; sinker nibs mounted on said sinker-nib bar; and sinker-nib operating means connected to said plunger for reciprocating the same.

13. The improved knitting machine according to claim 12 wherein the sinker-nib operating means includes an eccentric-carrying shaft and a connection between the eccentric of said eccentric-carrying shaft and said plunger for operating the same.

14. In a flat knitting machine wherein are employed knitting needles and needle-supporting and operating mechanisms, tongues and tongue-supporting and operating mechanisms, sinkers, sinker-nibs and sinker supporting and operating mechanisms, thread guides: the improvement which comprises a rigid support; a thread-guide-plunger guide rigidly mounted on said support; a plunger reciprocatively mounted in said guide; a cam carrying shaft; operative connections between the cam of said cam-carrying shaft and said plunger; a guide-bar head; a guide-bar-head-supporting shaft on which said guide-bar head is carried; means connecting said guide-bar head to said plunger; a guide bar mounted on said guide bar head for movement longitudinally in a direction transverse to the direction of the movements of said plunger; and thread guides mounted on said guide bar.

15. In a flat knitting machine according to claim 14 wherein is included a second guide-bar-supporting shaft; a second guide-bar head carried by said second guide-bar-supporting shaft; a guide bar mounted on said second guide-bar head for movement longitudinally in a direction transverse to the direction of movement of said plunger; thread guides mounted on said second guide bar; and a connection between said guide-bar heads to cause them to move with said plunger in unison.

16. In a flat knitting machine: a guide-bar-head-supporting shaft; a pin carried by said shaft; a guide-bar head slidably mounted on said pin; a guide-bar-racking shaft longitudinally slidably mounted in said head for movement along an axis at right angles to that of said pin; means to hold said guide-bar-racking shaft against turning; a guide bar secured to said guide-bar-racking shaft; thread guides mounted on said guide bar; and means to reciprocate said guide bar head along said pin.

17. In a flat knitting machine: a guide-bar-head-supporting shaft; a pin carried by said shaft; a guide bar head slidably mounted on said pin; a guide-bar-racking shaft longitudinally slidably mounted in said head for movement along an axis at right angles to that of said pin; means to hold said guide-bar-racking shaft against turning, said holding means comprising a guide bar slider attached to said guide-bar-shaft and having a pin entering an aperture in said guide bar head; a guide bar secured to said guide-bar-shaft; thread guides mounted on said guide bar; and means to reciprocate said guide-bar head along said pin.

18. In a flat knitting machine wherein are employed knitting needles and needle-supporting and operating mechanisms, tongues and tongue-supporting and operating mechanisms, sinkers, sinker-nibs, thread guides and thread-guide-supporting and operating mechanisms: the improvement which includes a frame with a supporting shaft; an eccentric-carrying shaft journalled in bearings in said frame; a sinker-nib-plunger guide rigidly supported on said supporting shaft; a sinker-nib plunger carrying said sinker-nibs and being reciprocatively mounted in said sinker-nib-plunger guide; an operative connection between an eccentric of said eccentric-carrying shaft and said sinker-nib plunger; a sinker-bar support; a sinker bar mounted on said sinker-bar support; said sinkers being mounted on said sinker bar for cooperation with said sinker-nibs.

19. In a flat knitting machine wherein are employed knitting needles and needle-supporting and operating mechanisms, tongues and tongue-supporting and operating mechanisms, sinkers, sinker-nibs, thread guides: the improvement which includes a frame with a supporting shaft; an eccentric-carrying shaft journalled in bearings in said frame; a sinker-nib plunger guide rigidly supported on said supporting shaft; a sinker-nib plunger carrying said sinker-nib and being reciprocatively mounted in said sinker-nib plunger guide; an operative connection between an eccentric of said eccentric-carrying shaft and said sinker nib-plunger; a sinker-nib bar support on said sinker-nib plunger; a sinker-nib bar mounted on said sinker-nib-bar support; said sinker nibs being mounted on said sinker-nib-bar; a thread-guide plunger; a thread-guide-plunger guide in which said thread-guide plunger is mounted and which is rigidly mounted on said supporting shaft; a guide-bar head carried by said thread-guide plunger; means for slidably supporting said guide-bar head; a guide bar mounted on said head for lengthwise movement in a direction at right angles to the direction of movement of said thread guide plunger; and thread guides mounted on said guide bar.

20. In a flat knitting machine: the improvement which includes a frame with a supporting shaft; a rotatable shaft journalled in bearings in said frame; an eccentric and cams on said rotatable shaft; a sinker-nib-plunger guide rigidly supported on said supporting shaft; a sinker nib plunger reciprocatively mounted in said sinker-nib-plunger guide; an operative connection between the eccentric of said rotatable shaft and said sinker-nib plunger; a sinker-nib bar-support on said sinker-nib plunger; a sinker-nib bar mounted on said sinker-nib-bar support; sinker-nibs mounted on said sinker-nib bar; a thread-guide plunger; a thread-guide-plunger guide in which said thread-guide plunger is mounted and which is rigidly mounted on said supporting shaft; a guide bar head carried by said thread guide plunger; means for slidably supporting said guide-bar head; a guide bar mounted on said guide-bar head for lengthwise movement in a direction at right angles to the direction of movement of said thread-guide plunger; thread guides mounted on said guide bar; and a connection between the cams of said rotatable shaft and said guide-bar plunger.

21. In a flat knitting machine: a duplex thread guide mechanism including; a pair of parallelly disposed guide-bar-head-supporting shafts; spacers secured to the respective guide-bar-head-supporting shafts, each spacer carrying a pin; a guide-bar head slidably mounted on said pin of each spacer; means connecting said heads together to move as one; means for reciprocating said heads on said pins; a guide bar mounted on each of said heads for longitudinal movement in a direction at right angles to the axes of said pins; and thread guides secured to each guide bar.

22. A flat knitting machine according to claim 21 wherein each of the guide-bar heads has a lubricant receiving chamber and a duct from said chamber to the slider pin on which the head is mounted.

23. In a flat knitting machine: a duplex thread guide mechanism including; a pair of parallelly disposed guide-bar-head-supporting shafts; spacers secured to the respective guide bar head supporting shafts, each spacer carrying a pin; a guide-bar head slidably mounted on the pin of each spacer; means connecting said heads together to move as one; means for reciprocating said heads on said pins; a guide-bar shaft slidably mounted in each guide bar head; means to prevent rotation of said shafts in said heads; a guide bar mounted on each guide-bar head for longitudinal movement in a direction at right angles to said pins; and thread guides mounted on said guide bars.

24. In a flat knitting machine: a frame including a pair of end members and supporting shafts connecting said end members; an upper cam and eccentric-carrying rotatable shaft and a lower eccentric-carrying shaft mounted in bearings in said frame; a knitting needle unit; a tongue unit; a sinker unit; a sinker-nib unit; a thread guide unit; each said needle, tongue and sinker-nib units including a plunger guide mounted rigidly on one of said supporting shafts, a plunger longitudinally reciprocatively mounted in said plunger guide, and connecting rods between the plungers of each said needle, tongue and sinker nib units and their respective eccentrics on said rotatable shafts; said thread guide unit including a plunger guide mounted rigidly on one of said supporting pipes, a plunger longitudinally reciprocatively mounted in said last named plunger guide, and a carriage between the plunger of said thread guide unit and a cam on said upper rotatable shaft; said thread guide unit further including guide bars bodily movable by and with the plunger of the same unit; and means for racking said guide bars, said racking means comprising a pattern wheel shaft; a reduction gear train between one of said rotatable shafts and the pattern wheel shaft; pattern wheels on said pattern wheel shaft; and operative connections between said pattern wheels and said guide bars.

25. A flat knitting machine according to claim 24 wherein said gear train includes a gear on said one of said rotatable shafts, a counter shaft, a gear on said counter shaft meshing with the gear on said one of said rotatable shafts, means for mounting said counter shaft in part on an end member of said frame and in part on one of said supporting pipes, and a gear connection between said counter shaft and said pattern wheel shaft.

26. In a flat knitting machine: a frame including supporting pipes; a thread-guide-plunger support mounted on one of said pipes; a thread-guide plunger longitudinally reciprocatively mounted in said thread-guide-plunger support; a guide-bar head carried by said plunger; at least one guide-bar-head-supporting shaft mounted in said frame and operatively connected with said guide bar head; a sliding carriage secured to said plunger; cam engaging rollers on said carriage; a sliding carriage support mounted on another of said supporting pipes; a rotatable shaft journalled in bearings in said frame; and cams on said last named rotatable shaft, which cams are engaged by said rollers.

27. In a flat knitting machine: a frame including supporting pipes; a thread-guide-plunger support mounted on one of said pipes; a thread-guide plunger longitudinally reciprocatively mounted in said thread-guide-plunger support; a guide-bar head carried by said plunger; at least one guide-bar-head-supporting shaft mounted in said frame and operatively connected with said guide bar head; guide-bar-racking shafts mounted in said guide bar head for movement transversely of the axis of said plunger; guide bars carried by said guide-bar-racking shafts; thread guides mounted on said guide bars; a sliding carriage secured to said plunger; cam engaging rollers on said carriage; a sliding carriage support mounted on another of said supporting pipes; a rotatable shaft journalled in bearings in said frame; and cams on said last named rotatable shaft, which cams are engaged by said rollers.

28. In a flat knitting machine; a constant motion shaft; vertically operating needle and tongue mechanisms operatively connected with said shaft; stationary sinkers through which said needle and tongue mechanisms operate; horizontally operating sinker-nib and thread guide mechanisms operatively connected with said shaft; base cloth guiding and feeding mechanism carrying the cloth horizontally between the sinkers and sinker-nibs in timed relation to the knitting operations, said base cloth guiding and feeding mechanism including cloth feed rollers and shafts located in back and in front of the needle position; means operatively connecting said feed rollers to turn in unison and keep the cloth taut in passing over the sinkers, a rocking arm on the shaft of one of said feed rollers, a one way clutch device connecting said arm with said feed roller shaft, and power transmitting and translating mechanism between said shaft and said rocker arm for effecting the movements thereof.

29. In a flat knitting machine for knitting through a base cloth wherein are provided a first motion shaft, knitting needles, stationary sinkers, movable sinker-nibs and means for operating said needles and said sinker-nibs from said first motion shaft: the improvement which includes, cloth feed rollers for carrying a base cloth over the sinkers and holding it taut over the same; and means powered from said first motion shaft for operating said feed rollers for purposes described.

30. In a flat knitting machine for knitting through a base cloth wherein are provided a first motion shaft, knitting needles, stationary sinkers, movable sinker-nibs and means for operating said needles and said sinker-nibs from said first motion shaft: the improvement which includes a pair of cloth feed rollers and shafts located in front of the needle and sinker positions; a pair of cloth feed rollers and shafts, located in back of the needle and sinker positions; operative connections between the two pairs of feed rollers whereby said rollers turn in unison; and power transmitting and translating mechanism operatively connecting said first motion shaft with said rollers.

31. A knitting machine according to claim 30 wherein the power transmitting and translating mechanism includes a one-way clutch device on the shaft of one of said feed rollers and a back check clutch device on the same shaft, a clutch operating arm carried by said one way clutch device, an auxiliary cam shaft, means for supporting said auxiliary cam shaft, a cam on said auxiliary cam shaft, a pivotally mounted rocker arm having operative engagement with said cam, an eccentric arm connected between said rocker arm and said clutch operating arm, a rotatable shaft operatively connected with said first motion shaft, a slotted cam arm on said cam, and a crank arm mounted on said rotatable shaft and having a roller working in the slot of said slotted cam arm.

32. In a flat knitting machine for knitting through a base cloth wherein are provided a first motion shaft, knitting needles, stationary sinkers, movable sinker-nibs and means for operating said needles and said sinker-nibs from said first motion shaft: the improvement which includes a pair of cloth feed rollers and shafts located in front of the needle and sinker positions: a pair of cloth feed rollers and shafts, located in back of the needle and sinker positions; operative connections between the two pairs of feed rollers whereby said rollers turn in unison; and power transmitting and translating mechanism operatively connecting said first motion shaft with said rollers, said mechanism including a one way clutch device on the shaft of one of said feed rollers and a back check clutch device on the same shaft, a clutch operating arm carried by said one way clutch device, an auxiliary cam shaft, means for supporting said auxiliary cam shaft, a cam on said auxiliary cam shaft, a pivotally mounted rocker arm having operative engagement with said cam, means for rigidly and adjustably connecting said eccentric arms and said rocker arm together at a variable angle to one another, a rotatable shaft operatively connected with said first motion shaft, a slotted cam arm on said cam, and a crank arm mounted on said rotatable shaft and having a roller working in the slot of said slotted cam arm.

33. In a machine for knitting through a base cloth which machine has a constantly rotating power shaft: the combination with stationary sinkers of means for holding the cloth taut where it passes over the sinkers and while the knitting needles of the machine pass through the cloth, said means including a pair of rollers in front of the sinkers, a pair of rollers in back of the sinkers, means connecting said pairs of rollers to turn in unison, the base cloth passing between the rollers of each pair, and means to operate said rollers in timed relation to the knitting function.

34. In a machine for knitting through a base cloth which machine has a constantly rotating power shaft: the combination with stationary sinkers of means for holding the cloth taut where it passes over the sinkers and while the knitting needles of the machine pass through the cloth, said means including a crank on said constantly rotating shaft, an auxiliary cam shaft, a cam on said auxiliary cam shaft, a slotted cam arm on said cam, a roller on said crank operating in the slot of said slotted cam arm, said cam having a cam groove, an arm pivoted at one end and having a cam-groove-engaging roller at its other end for operating in said cam groove, cloth feed rollers having shafts and being located in front and in back of the sinkers, a one way clutch on the shaft of one of said cloth feed rollers, a back check clutch on the same shaft, a clutch operating arm for said one way clutch, an eccentric arm pivoted at one of its ends to said first mentioned pivoted arm, said clutch operating arm having a slot, said eccentric arm having a roller running in said slot and an adjustable link connecting said eccentric arm to the arm to which it is pivoted for holding the same arms at an angle to one another.

35. In a machine for knitting through a base cloth which machine has a constantly rotating power shaft: the combination with stationary sinkers of means for holding the cloth taut where it passes over the sinkers and while the knitting needles of the machine pass through the cloth, said means including a crank on said constantly rotating shaft, an auxiliary cam shaft, a cam on said auxiliary cam shaft, a slotted cam arm on said cam, a roller on said crank operating in the slot of said slotted cam arm, said cam having a cam groove, an arm pivoted at one end and having a cam-groove-engaging roller at its other end for operating in said cam groove, cloth feed rollers having shafts and being located in front and in back of the sinkers, a one way clutch on the shaft of one of said cloth feed rollers, a back check clutch on the same shaft, a clutch operating arm for said one way clutch, an eccentric arm pivoted at one of its ends to said first mentioned pivoted arm, said clutch operating arm having a slot, said eccentric arm having a roller running in said slot, and an adjustable link connecting said eccentric arm to the arm to which it is pivoted for holding the same arms at an angle to one another, and a power transmitting connection between the feed rollers in back of the sinkers and the feed rollers in front of the sinkers.

GEORGE O. YOUNG.

REFERENCES CITED

The following references are of record in the file of this patent:

UNITED STATES PATENTS

| Number | Name | Date |
|---|---|---|
| 1,816,416 | Willingham | July 28, 1931 |
| 2,136,368 | Amidon | Nov. 15, 1938 |
| 2,155,146 | Morton et al. | Apr. 18, 1939 |
| 2,224,304 | Kellogg et al. | Dec. 10, 1940 |
| 2,243,850 | Amidon | June 3, 1941 |
| 2,313,725 | Amidon | Mar. 16, 1943 |
| 2,336,455 | Amidon | Dec. 14, 1943 |
| 2,339,153 | Cotterill | Jan. 11, 1944 |

FOREIGN PATENTS

| Number | Country | Date |
|---|---|---|
| 5,759 | Austria | Nov. 11, 1901 |
| 853,867 | France | Dec. 16, 1939 |